United States Patent
Muro et al.

(10) Patent No.: US 8,027,082 B2
(45) Date of Patent: Sep. 27, 2011

(54) RAMAN AMPLIFIER AND EXCITATION LIGHT SOURCE USED THEREOF

(75) Inventors: Shinichirou Muro, Kawasaki (JP); Tomoaki Takeyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 179 days.

(21) Appl. No.: 11/964,375

(22) Filed: Dec. 26, 2007

(65) Prior Publication Data

US 2008/0158657 A1 Jul. 3, 2008

(30) Foreign Application Priority Data

Dec. 27, 2006 (JP) ................. 2006-353132

(51) Int. Cl.
*H01S 3/30* (2006.01)
*H04B 10/17* (2006.01)
*H04B 10/12* (2006.01)

(52) U.S. Cl. ............ 359/334; 359/341.3; 359/345

(58) Field of Classification Search ........... 359/334, 359/341.3, 345
See application file for complete search history.

(56) References Cited

U.S. PATENT DOCUMENTS

| | | | |
|---|---|---|---|
| 6,151,438 A | | 11/2000 | Espindola et al. |
| 6,292,288 B1 * | | 9/2001 | Akasaka et al. ............ 359/334 |
| 6,512,628 B1 * | | 1/2003 | Terahara et al. ............ 359/334 |
| 6,782,151 B2 * | | 8/2004 | Sasaoka et al. ............ 385/15 |
| 2001/0014194 A1 * | | 8/2001 | Sasaoka et al. ............ 385/15 |
| 2002/0122242 A1 | | 9/2002 | Shimojoh |
| 2002/0159133 A1 | | 10/2002 | Kado et al. |
| 2008/0165412 A1 * | | 7/2008 | Watanabe ............ 359/341.3 |

FOREIGN PATENT DOCUMENTS

| | | |
|---|---|---|
| JP | 11-168255 | 6/1999 |
| JP | 2000-98315 | 4/2000 |
| JP | 2002-258335 | 9/2002 |
| JP | 2002-305342 | 10/2002 |

OTHER PUBLICATIONS

Japanese Patent Office Action mailed Sep. 28, 2010 for corresponding Japanese Patent Application No. 2006-353132.

* cited by examiner

*Primary Examiner* — Eric Bolda
(74) *Attorney, Agent, or Firm* — Staas & Halsey LLP

(57) ABSTRACT

A Raman amplifier provided with a pump source outputting a pumping light; a rare-earth doped fiber inputting the pumping light and outputting an excitation light; and a guiding unit guiding the excitation light to an optical fiber to a direction opposite to which a signal light propagates in the optical fiber. Also a Raman amplifier provided with a plurality of pump sources outputting a plurality of pumping lights; a plurality of rare-earth doped fibers inputting the each of the plurality of pumping lights and outputting a plurality of excitation lights; a guiding unit guiding the plurality of excitation lights to an optical fiber to a direction opposite to which a signal light propagates in the optical fiber.

12 Claims, 13 Drawing Sheets

US 8,027,082 B2

RAMAN AMPLIFIER AND EXCITATION LIGHT SOURCE USED THEREOF

The present invention claims foreign priority to Japanese application 2006-353132, filed Dec. 27, 2006, which is incorporated herein by reference in its entirety.

FIELD OF THE INVENTION

The present invention relates to a Raman amplifier, excitation light source used thereof, and particularly to a Raman amplifier having expanded gain range.

DESCRIPTION OF THE RELATED ART

The Raman amplifier utilizing stimulated Raman scattering (SRS), which is a nonlinear phenomenon in an optical fiber, is used in a long-haul wavelength division multiplex (WDM) optical transmission system for compensating a loss by a transmission line of optical fiber or a loss of a dispersion compensation fiber.

In a Raman amplifier used in an optical transmission system, SRS is generated in an optical fiber by introducing a excitation light with frequency about 13 THz higher (with a wavelength about 100 nm shorter) than the signal light and used to amplify the signal light power.

In a Raman amplifier, the higher the power of an excitation light guided to an optical fiber becomes, the higher the gain the signal light obtains become. Moreover, by inputting excitation lights of different wavelengths, Raman amplifier can amplify signal lights with wider frequency band, or wider wavelength band.

FIG. 11 is a block diagram of a Raman amplifier of the related art. As shown in FIG. 11, a signal light with its power decreased in the optical fiber transmission line 111 is amplified by stimulated Raman scattering (SRS) induced by an excitation light from an output end of the optical fiber transmission line 111.

An excitation light is outputted from a plurality of pump sources, shown as LD (Laser Diode) 102 to LD 105. The excitation lights outputted from the pump sources 102 to 105 are combined into a combined excitation light with a plurality of excitation light with different wavelengths by couplers 106 to 108. The Raman amplifier guides the combined excitation light to a transmission line that a signal light propagates, with a reverse direction to the signal light with coupler 109. For example, the Raman amplifier can amplify the wavelength division multiplexed signal light ranging from C-band to L-band by introducing a combined excitation light with a plurality of excitation lights of 1400 nm to 1500 nm into the optical fiber transmission line 111. Channel monitor 110 monitors an optical power of the signal light of each wavelength and control circuit 101 controls excitation light powers of the pump sources 102 to 105, based on the monitored power of the signal light by the channel monitor 110.

An Erbium Doped Fiber Amplifier (EDFA) is an optical fiber amplifier having higher amplification efficiency than a Raman amplifier, but the EDFA causes a large S/N (signal to noise ratio) deterioration, because the EDFA is positioned at the end of the optical fiber transmission line, where the level of the signal light is decreased to a bottom level.

On the other hand, the Raman amplifier amplifies a signal light in the optical fiber transmission line and starts amplification before the level of the signal light level is decreased to the bottom level and the Raman amplifier is also called as a distributed amplifier. Therefore, the Raman amplifier causes less S/N deterioration.

Accordingly, it is generally applied to use Raman amplifier for compensating a part of loss by the optical fiber transmission line and to use EDFA recovering a signal light level. By using the structure, a higher S/N can be achieved compared to the structure using only a single EDFA.

To adapt to various transmitting conditions, Raman amplifiers are required to have a wide range of gain variation. One of the factors limiting the range of gain variation is a range that pump source outputs. In more concrete, an upper gain limit corresponds to the maximum output power of the pump source, and a lower limit of the gain corresponds to a minimum output power that the pump source can stably supply.

The reason that lower limit of the gain of the Raman amplifier is limited by the lower output power limit that the pump source can stably supplying the excitation light is because if an output power of the pump source is set too small, spectrum and power of the excitation light become unstable and thereby a signal amplifying characteristic of the Raman amplifier becomes also unstable, giving influence on a signal light transmission characteristic.

FIG. 12 shows a relationship between an excitation light inputted to the optical fiber transmission line (amplifying medium) and gain of signal light (Raman gain) amplified with SRS. As shown in FIG. 12, the excitation light inputted to the optical fiber transmission line and the Raman gain are almost in the proportional relationship and not largely depending on the number of channels to be amplified. The Raman gain corresponding to the lower limit of the excitation light power of the pump source becomes the minimum gain of the Raman amplifier, while the Raman gain corresponding to the upper limit of the excitation light power of the pump source.

As explained above, the lower limit of the excitation light power of the pump source is limited to the excitation light power that pump source can stably supply. Therefore, gain range of the Raman amplifier is indicated as the range expressed with a solid line, except for a range dotted line in the figure.

To widen the gain range of the Raman amplifier, it is thought to be possible to decrease the minimum gain of the Raman amplifier. To decrease the minimum gain of the Raman amplifier, it is thought to be possible to insert an optical attenuator into an output of the pump source. By inserting the optical attenuator, the lower limit of the excitation light power is further decreased and thereby a gain can be obtained even in the range indicated by the dotted line in FIG. 12. Relating to the technology, an optical fiber amplifier with a fixed attenuator is inserted to an excitation light output is known, as disclosed Japanese Publication JP11-168255), in order to stabilize the excitation light output under the low current drive period.

FIG. 13 is a block diagram of the Raman amplifier in which an optical attenuator is inserted to a pumping light source. In the case of the Raman amplifier in FIG. 13, the optical attenuator 122 is inserted between the pump source (LD in FIG. 13) 121 and the coupler 123 for sending the excitation light to the optical fiber transmission line. The optical attenuator 122 attenuates the excitation light for about 3 dB.

The excitation light power of the pump source 121 is required to be doubled because the optical attenuator 122 of 3 dB (=½) is inserted. Therefore, the pump source 121 can stably output the excitation light under the minimum gain operation period and can reduce the minimum gain to a half compared to the case when the optical attenuator 122 is not inserted.

However, even when the pump source 121 is operated in the maximum excitation light power, the excitation light is decreased by 3 dB with the optical attenuator 122. Therefore, gain range cannot be increased only by inserting the optical attenuator 122.

SUMMARY

Various embodiments of the present invention includes Raman amplifier provided with a pump source outputting a pumping light; a rare-earth doped fiber inputting the pumping light and outputting an excitation light; and a guiding unit guiding the excitation light to an optical fiber to a direction opposite to which a signal light propagates in the optical fiber.

Various embodiments of the present invention also includes a Raman amplifier provided with a plurality of pump sources outputting a plurality of pumping lights; a plurality of rare-earth doped fiber inputting the each of the plurality of pumping lights and outputting a plurality of excitation lights; a guiding unit guiding the plurality of excitation lights to an optical fiber to a direction opposite to which a signal light propagates in the optical fiber.

The subject matter which is regarded as the invention is particularly pointed out and distinctly claimed in the concluding portion of the specification. The invention, however, together with further objects and advantages thereof, may best be understood by reference to the following description taken in conjunction with the accompanying drawings.

DESCRIPTION OF THE PREFERRED EMBODIMENTS

Figure 1:
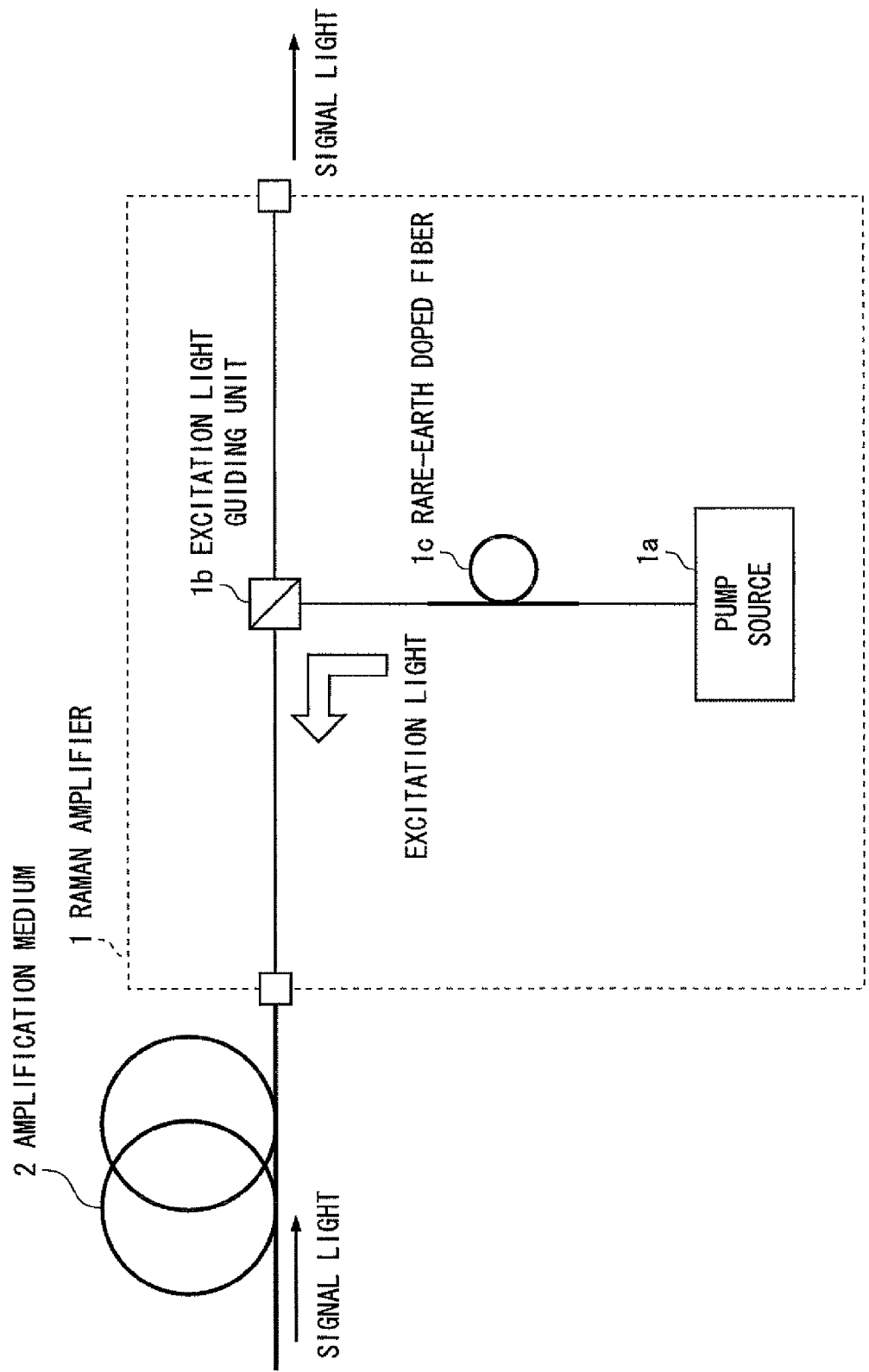
FIG. 1 is a schematic block diagram showing a Raman amplifier of an embodiment of the present invention.

Reference will now be made in detail to embodiments, examples of which are illustrated in the accompanying drawings, wherein like reference numerals refer to like elements throughout.

FIG. 1 is a schematic diagram showing the Raman amplifier of an embodiment of the present invention. As is shown in FIG. 1, the Raman amplifier 1 includes a pump source 1a, an excitation light guiding unit 1b, and a rare-earth doped fiber 1c. Moreover, an amplifying medium 2 such as an optical fiber transmission line and a distributed compensation optical fiber is connected to the side where a signal light of the Raman amplifier 1 is inputted.

The pump source 1a outputs an excitation light for Raman-amplification of the signal light propagating the amplification medium 2. The excitation light guiding unit 1b guides (inputs) the excitation light outputted from the pump source 1a to the amplification medium 2. The excitation light guiding unit 1b can be a coupler or a polarization combining coupler.

The rare-earth doped fiber 1c is inserted between the pump source 1a and the pumped optical guiding unit 1b. The rare-earth doped fiber 1c has characteristics that the smaller the excitation light power of the pump source 1a is, the larger absorption of the excitation light becomes. Thus, the larger the excitation light power of pump source 1a becomes, the smaller the absorption of the excitation light becomes.

When the excitation light power of the pump source 1a is decreased to reduce a gain of the Raman amplifier 1, the absorption of the excitation light by the rare-earth doped fiber 1c increases. Therefore, the excitation light power of the pump source 1a can be maintained high and the minimum gain can be reduced in the situation of reducing Raman gain.

Moreover, when the excitation light power of the pump source 1a is increased in order to increase a gain of the rare-earth doped fiber 1c, absorption of the excitation light of the rare-earth doped fiber 1c is decreases. Therefore, maximum gain does not decrease due to the insertion of the rare-earth doped fiber 1c, unlike the situation of inserting optical attenuator 122 shown in FIG. 13.

As explained above, in the Raman amplifier shown in FIG. 1, the rare-earth doped fiber 1c is disposed between the pump source 1a and the excitation light guiding unit 1b. The rare-earth doped fiber 1c has the characteristics that the smaller the excitation light power outputted from the pump source 1a is, the larger absorption of the excitation light becomes and that the larger the excitation light power is, the smaller absorption of the excitation light becomes. Accordingly, the pump sources can stably operate when the gain of the Raman amplifier 1 is at minimum and thus the Raman amplifier 1 assures a wide gain range.

Figure 2:
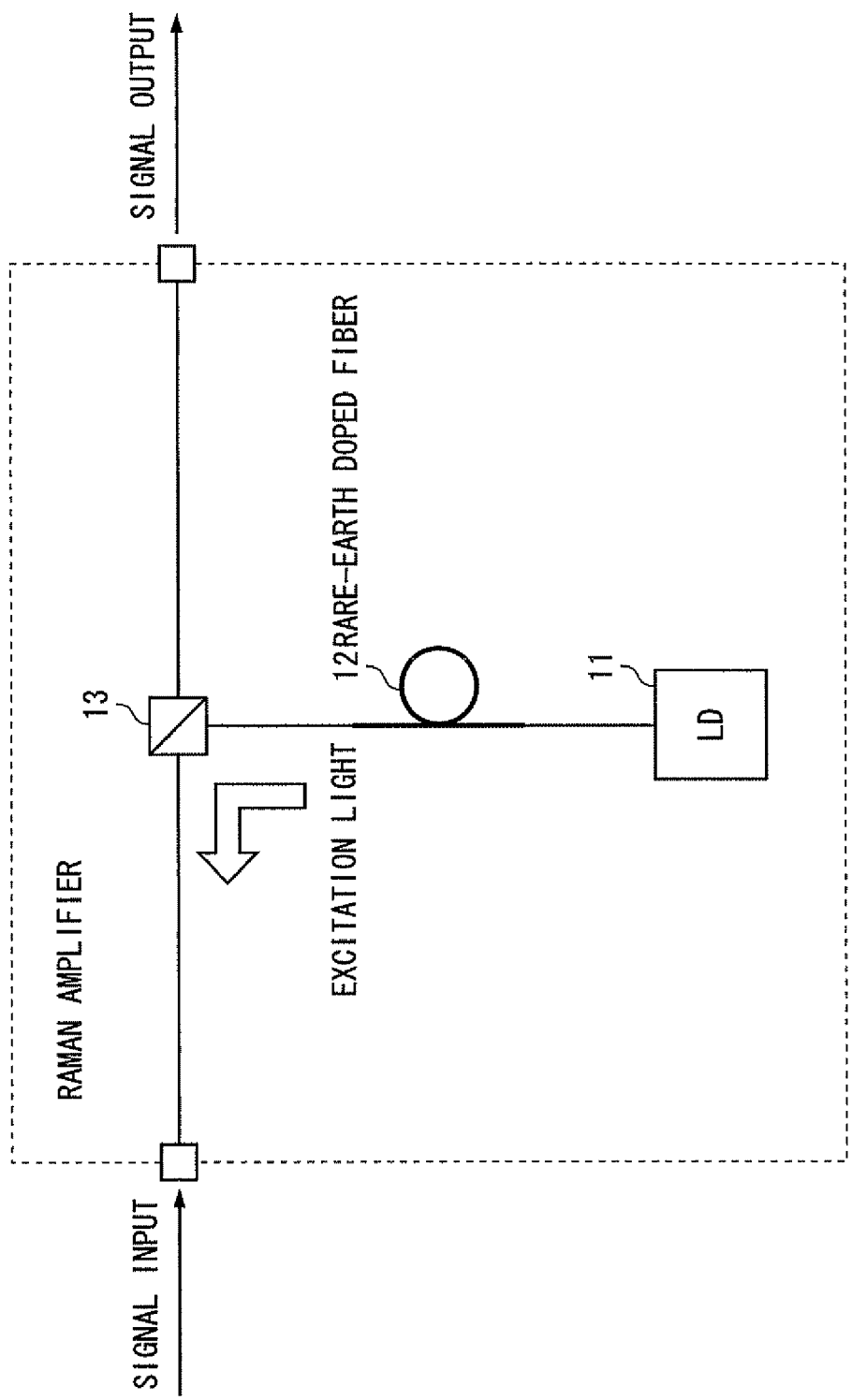
FIG. 2 is a block diagram of the Raman amplifier of an embodiment of the present invention.

FIG. 2 is a block diagram of the Raman amplifier of an embodiment of the present invention. As shown in FIG. 2, the Raman amplifier includes the pump source (LD) 11, rare-earth doped fiber 12 and coupler 13. The Raman amplifier shown in the figure amplifies a signal light in the optical transmission system for transmitting the signal light of the C-band or L-band.

The rare-earth doped fiber 12 is, for example, an erbium doped fiber (EDF) having an absorption band in the range from 1400 nm to 1600 nm. The coupler 13 guides an excitation light outputted from the pump source 11 to a signal path. In the signal input side of the figure, an optical fiber transmission line for transmitting the signal light or distributed compensation optical fiber is connected and the coupler 13 guides the excitation light having passed the rare-earth doped fiber 12 to these optical fibers. The coupler 13 may be a polarization combining coupler.

When higher Raman gain is required, the pump source 11 outputs a higher power of excitation light, and the rare-earth doped fiber 12 shows a lower loss due to the self-transmitting effect. On the contrary, when a lower Raman gain is required, the pump source 11 outputs a lower power of excitation light, and the rare-earth doped fiber 12 causes a higher loss. Namely, the rare-earth doped fiber 12 shows the characteristics that the smaller the excitation light power of the pump source 1 is, the larger absorption of the excitation light outputted from the pump source 11 becomes and that the larger the excitation light power of the pump source 11 is, the smaller absorption of the excitation light outputted from the pump source 11 becomes.

For example, when the pump source 11 guides the excitation light in the wavelength of 1489 nm to the optical fiber and the signal light in the wavelength of about 1580 nm is amplified, the rare-earth doped fiber 12 absorbs the excitation light in the wavelength of 1480 nm inversely proportional to the excitation light power. The smaller the excitation light power of the pump source 11 becomes, the more absorption of the excitation light increases.

Also, the larger the excitation light power becomes, the more absorption of the excitation light decreases. Accordingly, power range (a range from the upper limit value to the lower limit value), of the excitation light guided to the optical fiber is expanded and gain range of the Raman amplifier becomes wider.

The rare-earth doped fiber 12 having absorbed the excitation light generates amplified spontaneous emission (ASE) in the C-band. Generated ASE is partially deleted with the coupler 13 and the rest of the ASE is guided to the optical fiber connected in the signal input side.

Since the ASE power is smaller than the excitation light and the guided ASE propagates in the opposite direction of the signal light, the guided ASE does not affect the transmission of the signal light. Some part of the generated ASE is also returned to the side of the pump source 11. In the ordinary pumping structure, operation of the pump source 11 is not affected by the returned ASE and does not become unstable, since an optical isolator is inserted to the pumping structure.

Figure 3:
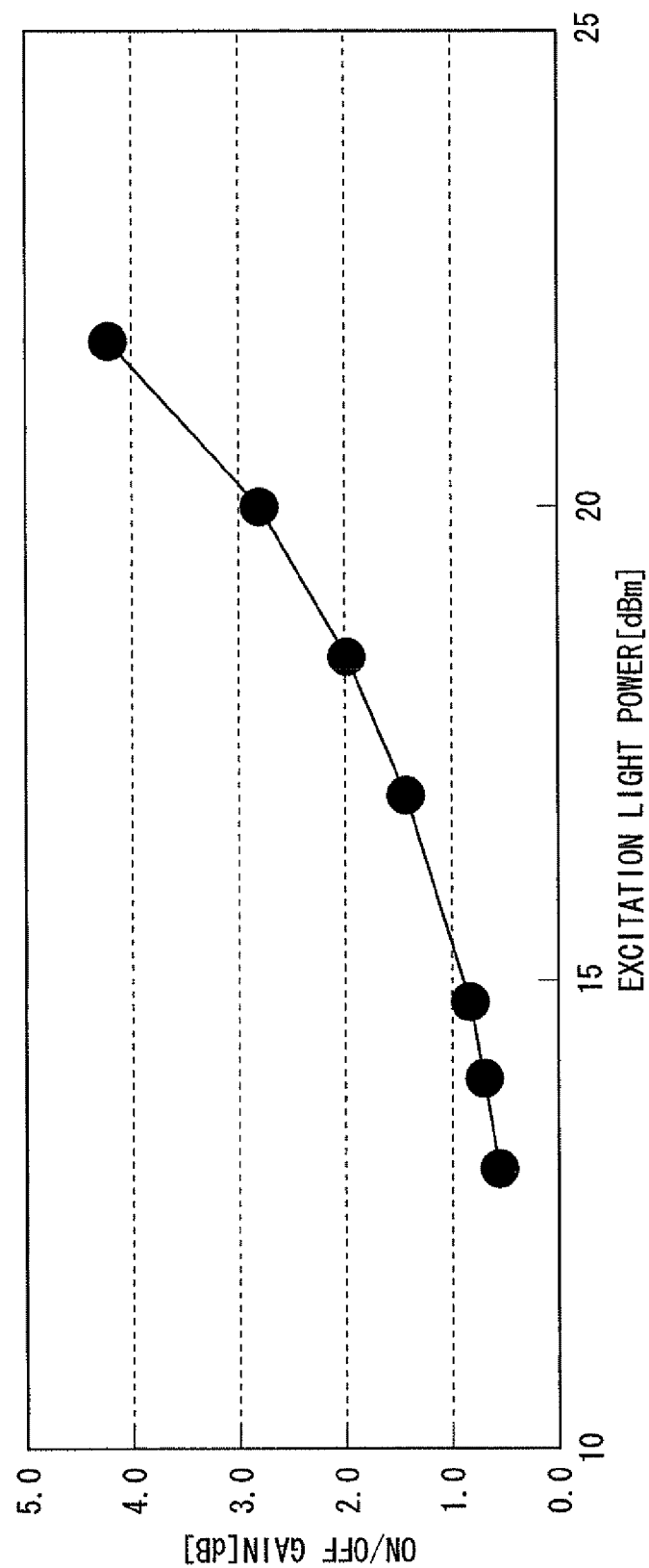
FIG. 3 is a diagram showing a relationship between the excitation light power in the structure where a rare-earth doped fiber from the Raman amplifier of FIG. 2 and an ON/OFF gain.

FIG. 3 is a diagram showing a relationship between the excitation light power and ON/OFF gain in the structure attained by eliminating the rare-earth doped fiber from the Raman amplifier of FIG. 2. The ON/OFF gain is defined as a ratio of the signal light output in the state where the excitation light is OFF (the excitation light is not inputted to the amplification medium) and the signal light output in the state where the excitation light is ON (the excitation light is inputted from the amplification medium). The ON/OFF gain increases when the excitation light output power outputted from the pump source 11 increases as shown in FIG. 3. Thus in order to obtain a large gain with the Raman amplifier, an output power of the pump source 11 is to be increased.

The relationship between the excitation light power and ON/OFF gain shown in FIG. 3 has been calculated under the conditions that the optical fiber transmission line connected to the signal input side is formed of a single mode fiber (SMF), transmission length is 100 km, transmission loss is 0.20 dB/km@1550 nm, the signal light of 0 dBm (wavelength: 1580 nm) is guided to the optical fiber transmission line, and the excitation light wavelength is 1480 nm.

Figure 4:
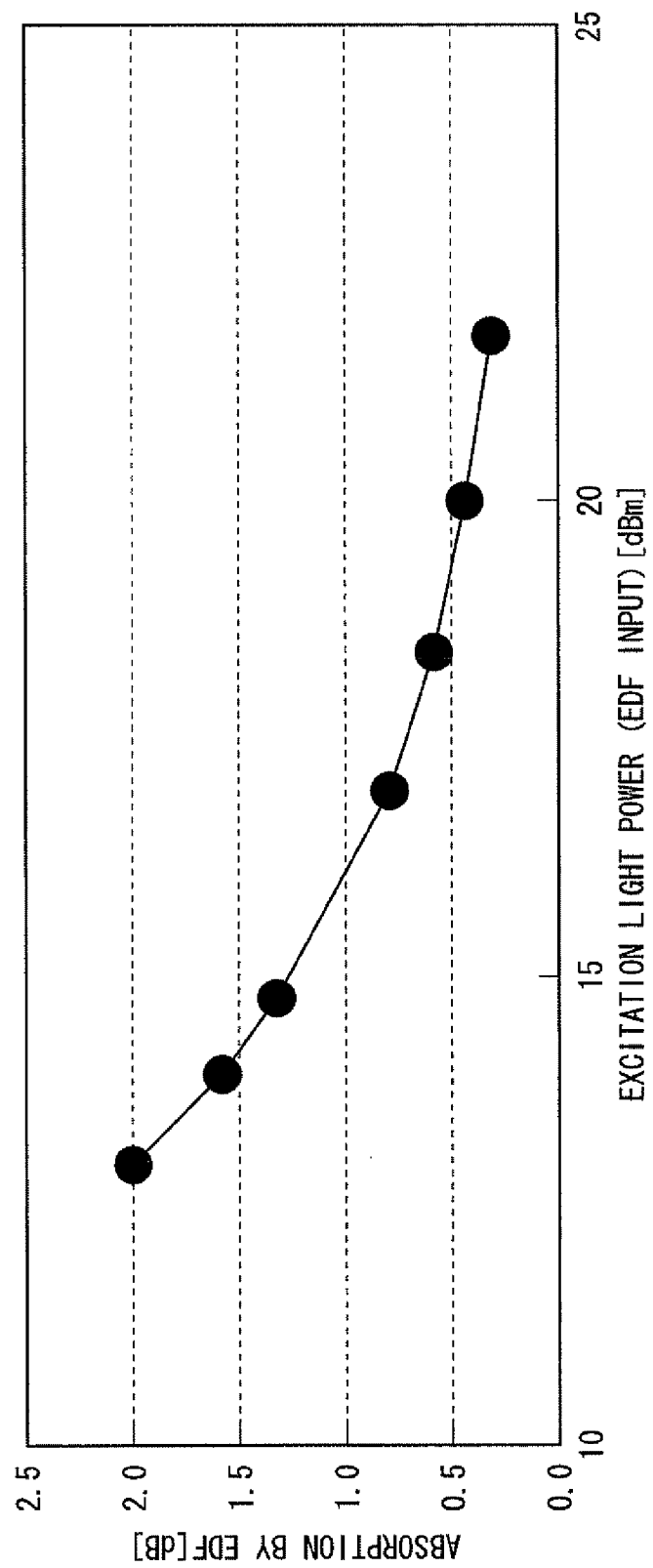
FIG. 4 is a diagram showing a relationship between the excitation light power and absorption by EDF of excitation light power absorbed.

FIG. 4 is a diagram showing a relationship between excitation light and absorption of excitation light power absorbed by EDF. EDF (rare-earth doped fiber 12) has the characteristics that, as shown in FIG. 4, the smaller the excitation light power of the excitation light inputted from the pump source 11 becomes, the larger the absorption of the excitation light by the EDF becomes and that the larger the excitation light power inputted from the pump source 11 rises, the smaller absorption of the excitation light becomes.

FIG. 4 shows absorption of EDF for the excitation light power when the EDF length is set to 6 m and excitation light wavelength is set to 1480 nm. From FIG. 4, it is obvious absorption of the excitation light of EDF is 0.3 [dB] when the excitation light power is set to 21.8 [dBm] (150 [mW]). Moreover, when the excitation light power is set to 13 [dBm] (20 [mW]), absorption of the excitation light of EDF becomes 2.0 [dB], which is larger than that attained when the excitation light of 21.8 [dBm] is inputted.

Figure 5:
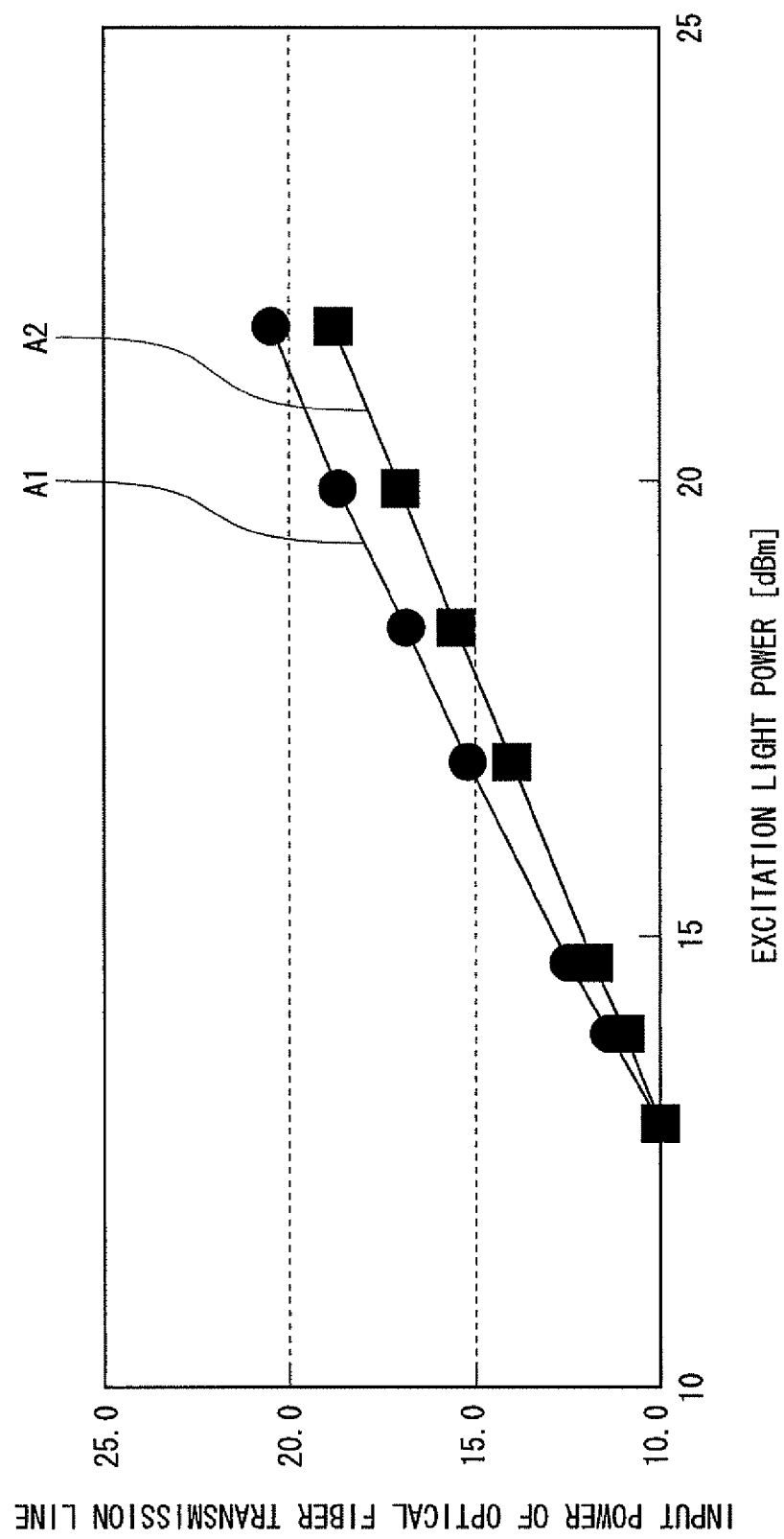
FIG. 5 is a diagram showing a relationship between the excitation light power outputted from a pump source and excitation light power inputted to an optical fiber transmission line.

FIG. 5 shows a relationship between the excitation light power outputted from the pump source and the excitation light power inputted to the optical fiber transmission line. A line A1 in FIG. 5 shows a relationship between the excitation light power outputted from the pump source 11 of the Raman amplifier of FIG. 2 and excitation light power inputted to the optical fiber transmission line in the signal input side. A line A2 shows a relationship between the power of excitation light outputted from the pump source 121 of the Raman amplifier of FIG. 13 and the power of excitation light inputted to the optical fiber transmission line.

FIG. 5 shows the results when the EDF length is set to 6.0 m and wavelength of the excitation light is set to 1480 nm. Moreover, the calculation has been conducted assuming that loss in the pumping system of FIG. 2 and FIG. 13 (a route up to the optical fiber transmission line input from the pump source except for the optical attenuator 122 in FIG. 13) is 1 dB.

Figure 13:
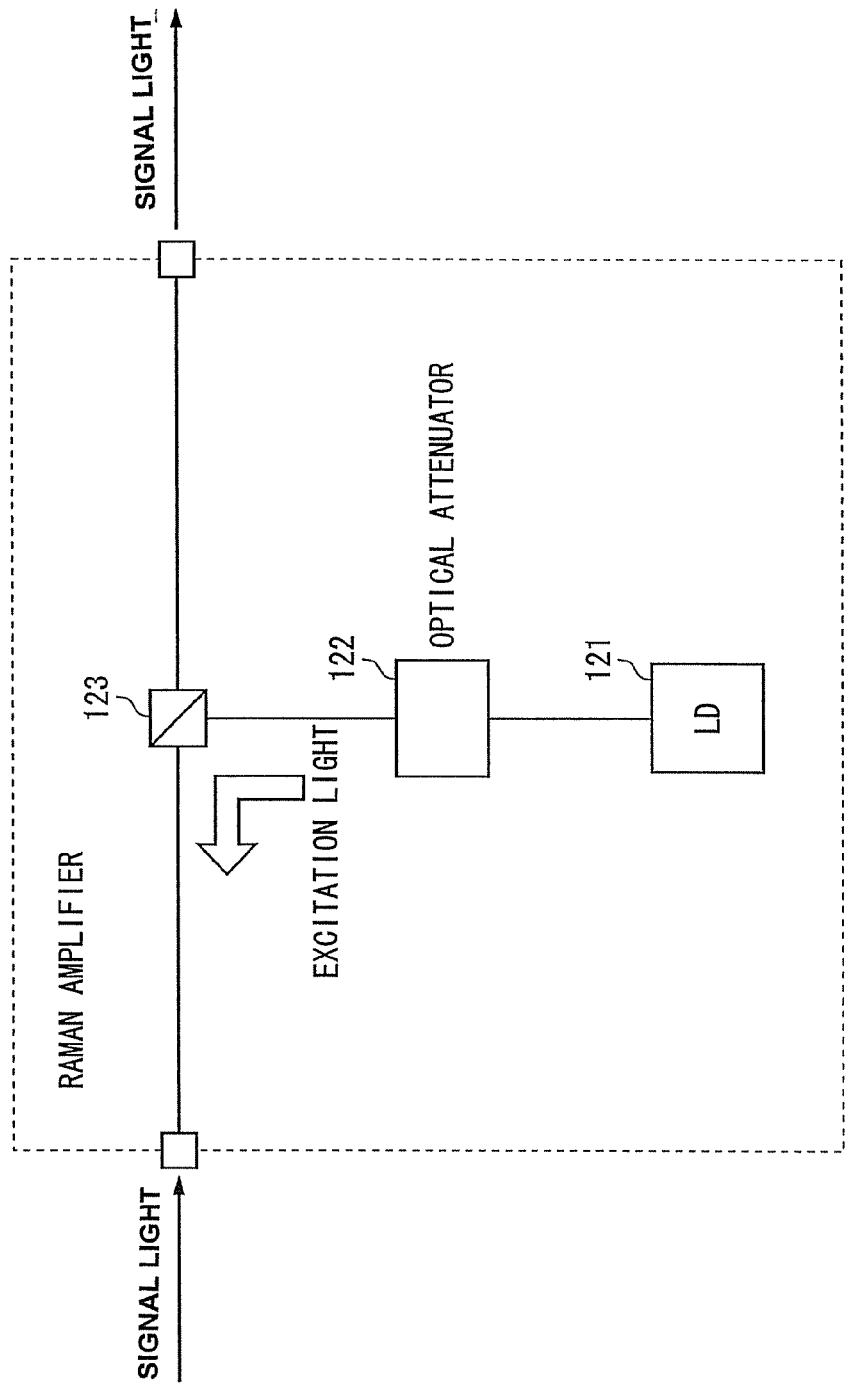
FIG. 13 is a block diagram of the Raman amplifier in which an optical attenuator is inserted to a pumping light source.

In the Raman amplifier of FIG. 13, the excitation light power inputted to the optical fiber transmission line varies from 10 [dBm] to 18.8 [dBm] for variation of the excitation light power of 13 [dBm] to 21.8 [dBm] of the pump source 121 as shown by the line A2.

Meanwhile, in the Raman amplifier of FIG. 2, the excitation light power inputted to the optical fiber transmission line varies from 10 [dBm] to 20.5 [dBm] for variation of the excitation light power of 13 [dBm] to 21.8 [dBm] of the pump source 11 as shown by the line A1. Namely, in the Raman amplifier of FIG. 2, an input range of the excitation light power to the optical fiber transmission line can be expanded as much as 1.7 [dBm] for the Raman amplifier of FIG. 13.

Figure 6:
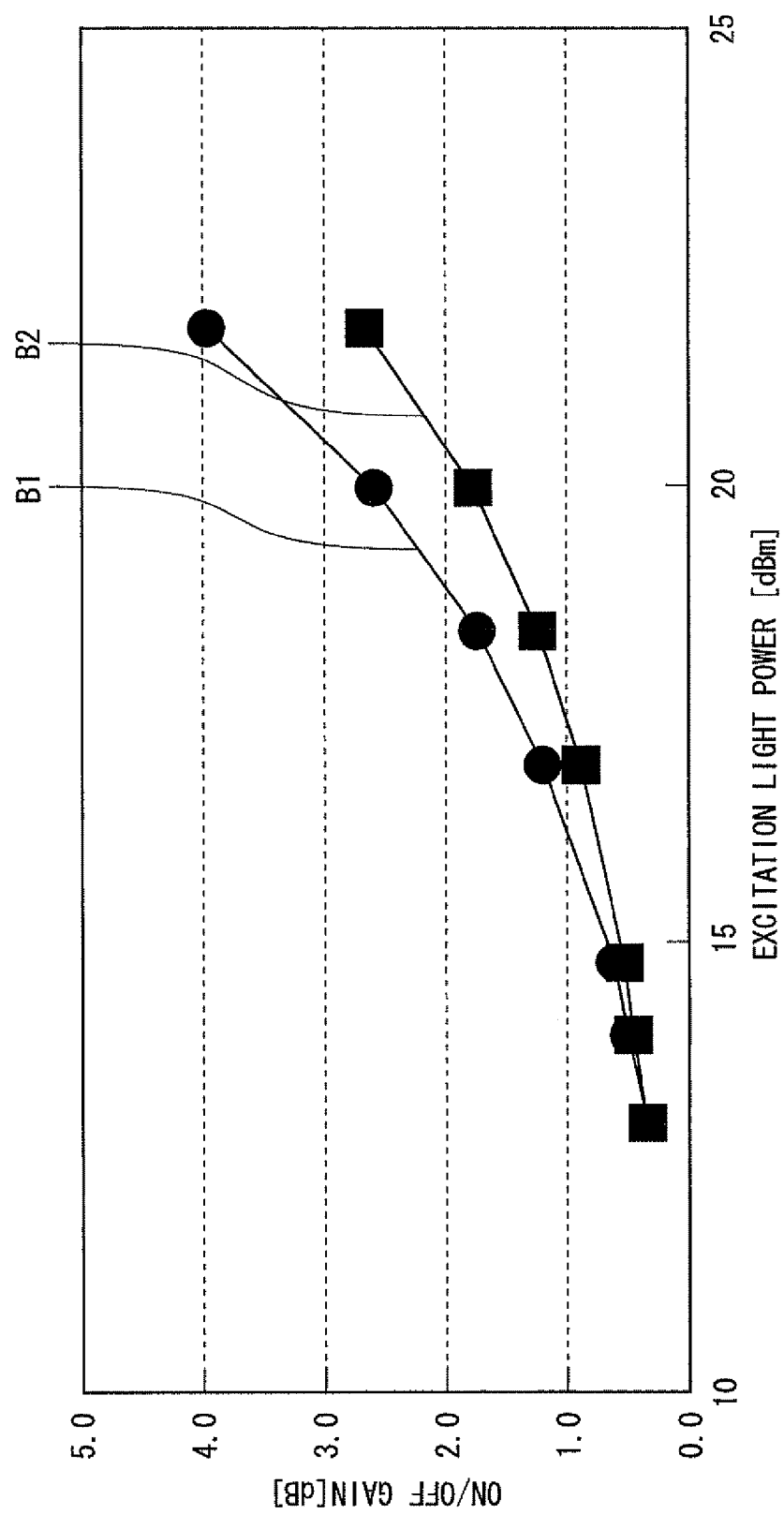
FIG. 6 is a diagram showing a relationship between the excitation light power outputted from the pump source and ON/OFF gain.

FIG. 6 shows a relationship between the excitation light power outputted from the pump source and the ON/OFF gain. The line 1B in this figure shows a relationship between the excitation light power outputted from the pump source of the Raman amplifier of FIG. 2 and the ON/OFF gain. The line b2 shows a relationship between the excitation light power outputted from the pump source 121 of the Raman amplifier of FIG. 13 and the ON/OFF gain. The signal condition in this figure is same as that of FIG. 3 and the conditions of the pumping structure and excitation light power are also same as that of FIG. 5.

As shown by the lines B1 and B2, the Raman amplifier in FIG. 13 has the minimum gain equal to that of the Raman amplifier in FIG. 2. However, the maximum gain of the Raman amplifier in FIG. 13 is reduced by 1 [dB] compared to that of the Raman amplifier in FIG. 2.

Figure 7:
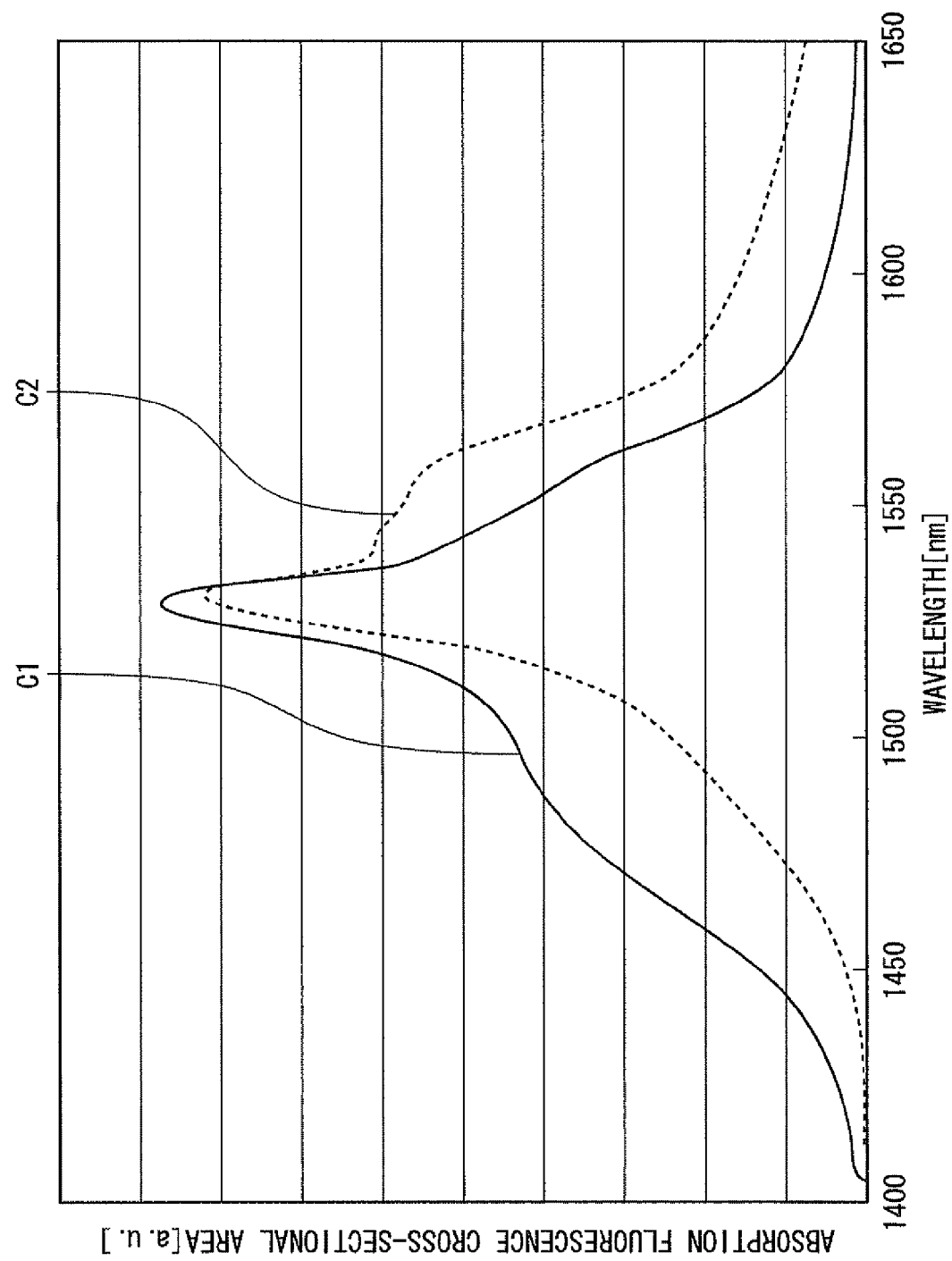
FIG. 7 is a diagram showing absorption characteristic and fluorescence characteristic of EDF.

FIG. 7 is a diagram showing an absorption characteristic and a fluorescence characteristic of EDF. The line C1 in FIG.

7 shows the absorption characteristic of EDF, while the line C2, the fluorescence characteristic (gain) of EDF.

Figure 8:
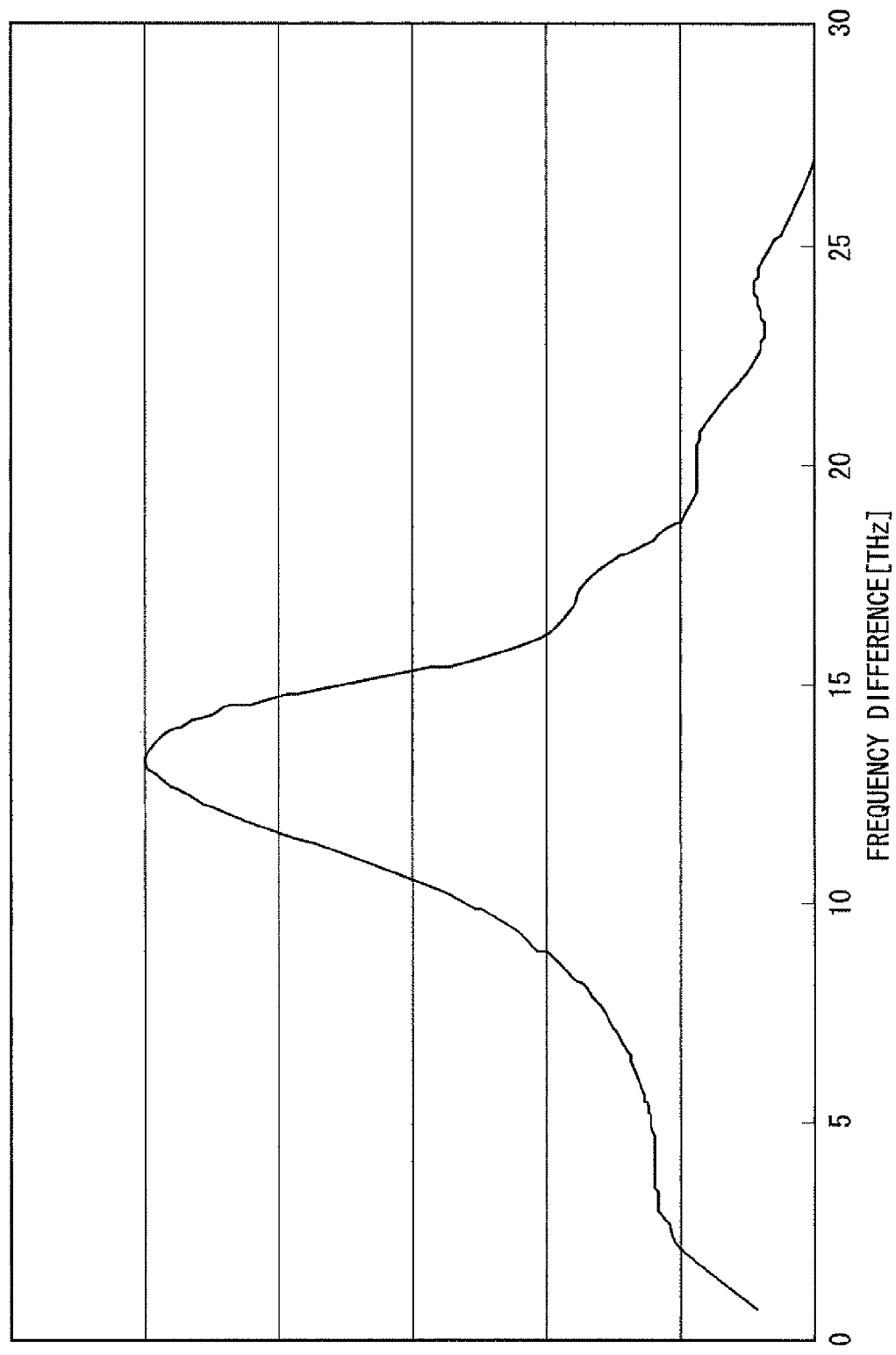
FIG. 8 is a diagram showing a gain characteristic for frequency difference between excitation light and signal light to be amplified.

FIG. 8 is a diagram showing a gain characteristic with SRS for a frequency difference between the excitation light and the signal light to be amplified. The signal light transmitted through the optical fiber transmission line is amplified in the lower frequency band (long wavelength side) for a frequency of the excitation light of the pump source 11. From FIG. 8, the maximum gain of the signal light can be obtained when the frequency difference between the frequency of excitation light and the frequency of signal light is about 13 THz.

For example, when the excitation light of 1450 nm (206 THz) is inputted to the optical fiber transmission line from the pump source 11 in the Raman amplifier of FIG. 2, the signal light of 1550 nm (193 Hz) in the low frequency side of about 13 THz has the maximum gain.

If wavelengths of the excitation lights outputted from the pump source 11 are different, absorption of EDF is also different and the line of FIG. 4 also changes (absorption shown in FIG. 4 corresponds to the excitation light wavelength of 1480 nm). For example, the absorption characteristic of EDF becomes small at the frequency around 1400 nm as shown in FIG. 7. In this case, the line of FIG. 4 becomes almost straight for the excitation light power. Moreover, the line A1 of FIG. 5 becomes 2 dB more in the entire part. Namely, the result is same as that obtained when any unit is not inserted between the pump source 11 and the coupler 13.

When the excitation light wavelength is between 1400 nm and 1500 nm, the rare-earth doped fiber 12 shows larger absorption. The situation is shown FIG. 7 when the wavelength becomes longer. Accordingly, in this case, the smaller the excitation light power is, the upper the line of FIG. 4 shifts (state where absorption increases). Moreover, the smaller the excitation light power is, the lower the line A1 of FIG. 5 in the low output power part shifts.

As explained above, the rare-earth doped optical fiber 12 is inserted between the pump source 1 and the optical fiber for amplifying the signal light. This optical fiber 12 has the characteristics that the smaller the excitation light power becomes, the larger the absorption of the excitation light becomes and that the larger the excitation light power becomes, the smaller the absorption of the excitation light becomes. Therefore, the wide gain range is obtained by avoiding unstable operation in the low excitation light output power of the pump source.

Next, another embodiment will be explained in detail with reference to the accompanying drawings. In the embodiment, the excitation lights of a plurality of wavelengths are combined and are then inputted to the optical fiber. Accordingly, signal lights with wide wavelength range can be amplified and wide gain range can also be obtained.

Figure 9:
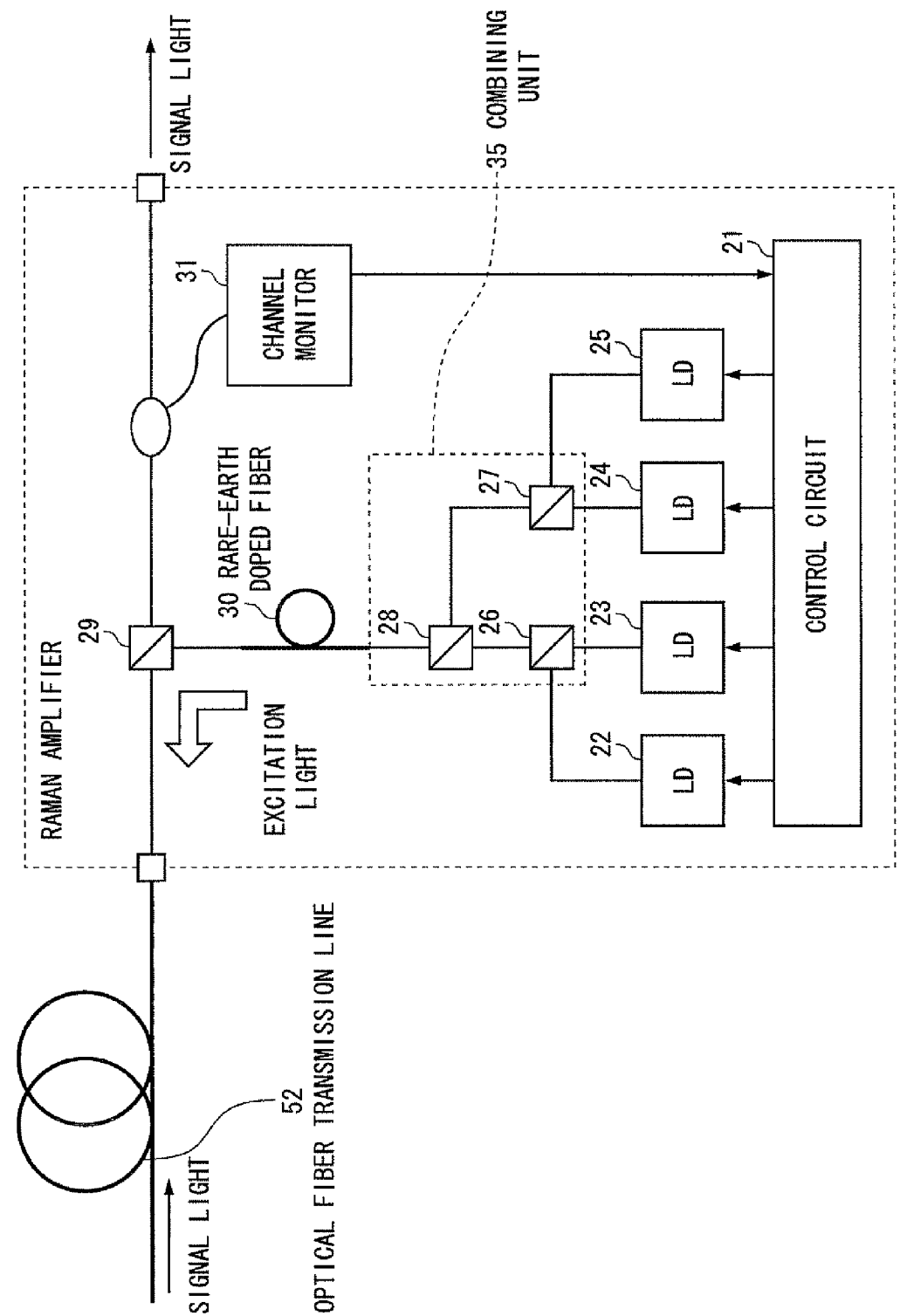
FIG. 9 is a block diagram of the Raman amplifier of an embodiment of the present invention.

FIG. 9 is a block diagram of the Raman amplifier of an embodiment of the present invention. As shown in FIG. 9, the Raman amplifier includes the control circuit 21, pump sources (LD) 22 to 25, couplers 26 to 29, rare-earth doped fiber 30, and a channel monitor 31. The Raman amplifier in this figure outputs the excitation lights of a plurality of wavelengths from a plurality of pump sources 22 to 25 and amplifies a plurality of signal lights in wider frequency band.

The pump sources 22 to 25 output excitation lights of different wavelengths. The combining unit 35 includes coupler 26, 27, and 28. The coupler 26 combines the excitation lights outputted from the pump sources 22, 23. The coupler 27 combines the excitation lights outputted from the pump sources 24, 25. The coupler 28 combines the excitation lights outputted from the couplers 26, 27.

The rare-earth doped fiber 30 is, for example, an EDF. The rare-earth doped fiber 30 has the characteristics as shown in FIG. 4 that the smaller the combined excitation light powers is, the larger the absorption of the excitation light becomes and that the larger the combined excitation light power is, the smaller the absorption of the excitation light becomes.

The coupler 29 guides the excitation light having passed the rare-earth doped fiber 30 to the optical fiber transmission line 32. Therefore, the signal light transmitted through the optical fiber transmission line 32 is amplified within the optical fiber transmission line 32.

The channel monitor 31 monitors an optical power of the signal light of each wavelength and the control circuit 21 controls the excitation light power of the pump sources 22 to 25 on the basis of the optical power of signal light monitored by the channel monitor 31.

As explained above, a plurality of signal lights in wider frequency band (or wide wavelength band) can be amplified by using a plurality of pump sources 22 to 25 and guiding the combined excitation lights of a plurality of wavelengths to the optical fiber transmission line 32. Accordingly, wide band gain range can be obtained with the rare-earth doped fiber 30.

Moreover, only one rare-earth doped fiber 30 is required by guiding the combined excitation lights of a plurality of wavelengths to the rare-earth doped fiber 30 and cost reduction may also be realized.

Next, another embodiment will be explained in detail with reference to the accompanying figures. In the embodiment, the rare-earth doped fiber is connected respectively to outputs of the pump sources and the plurality of excitation lights outputted from the rare-earth doped optical fiber are combined and then guided to the optical fiber.

Figure 10:
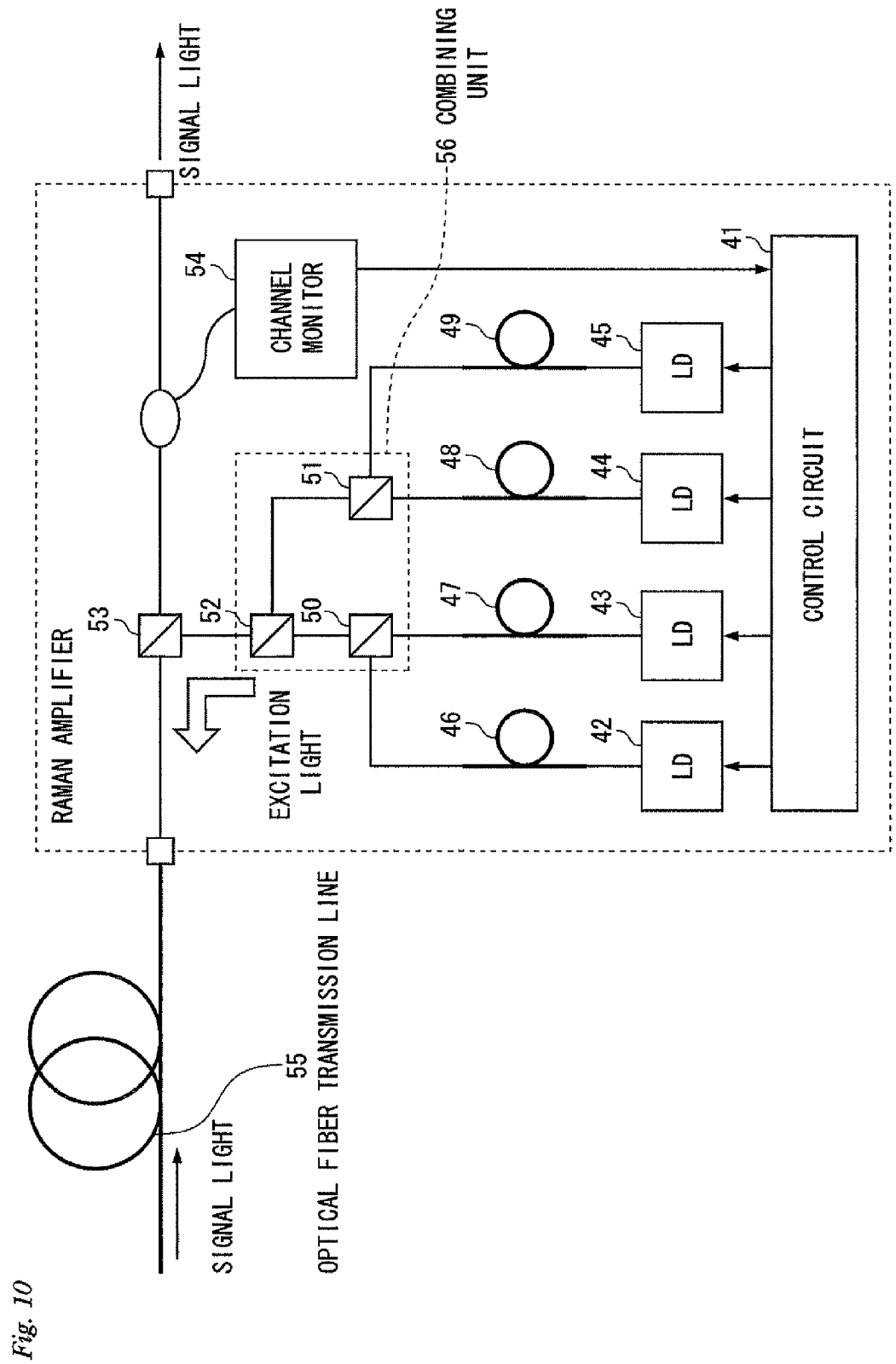
FIG. 10 is a block diagram of the Raman amplifier of an embodiment of the present invention.
Figure 11:
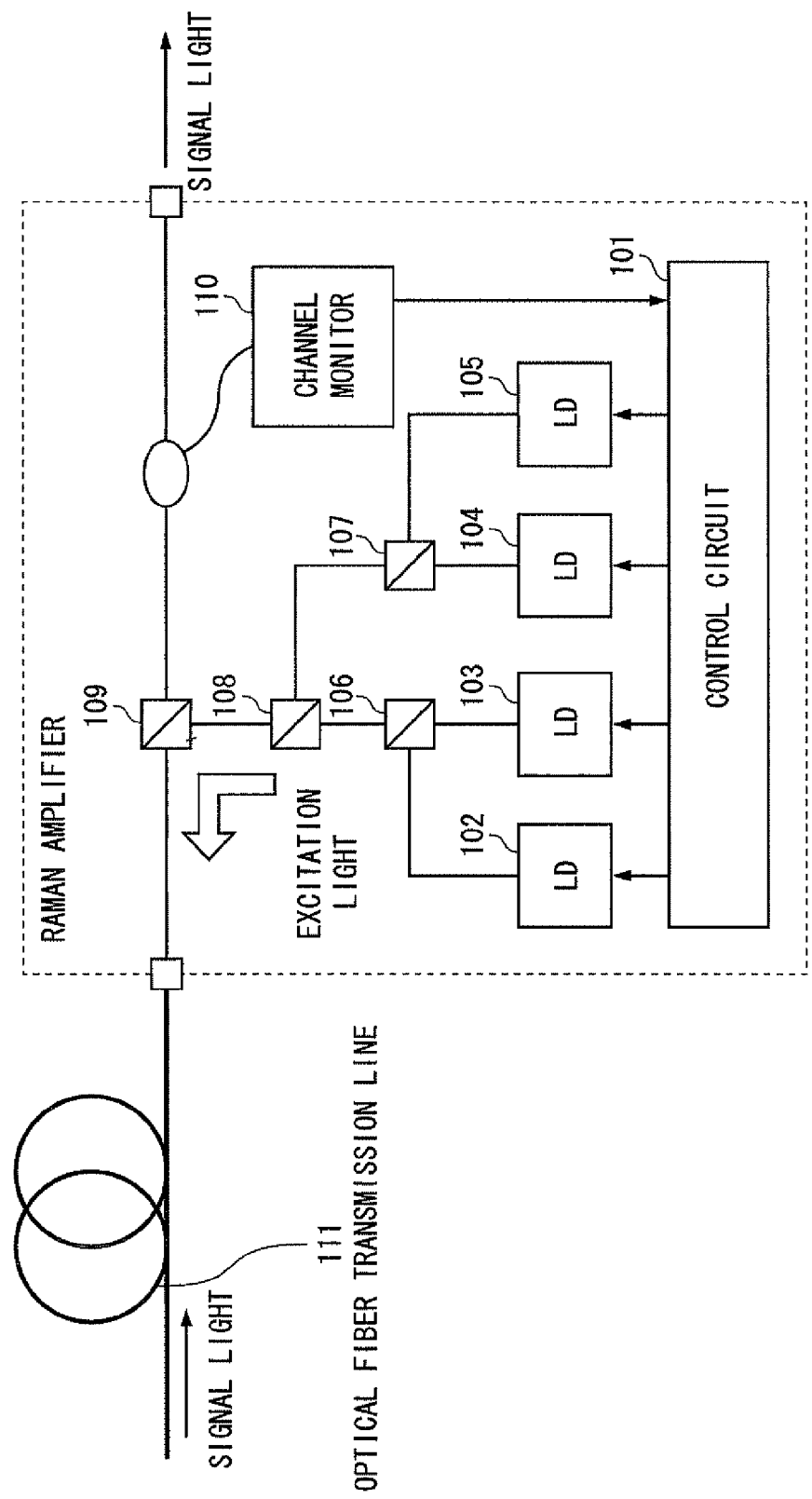
FIG. 11 is a block diagram of a Raman amplifier of the related art.
Figure 12:
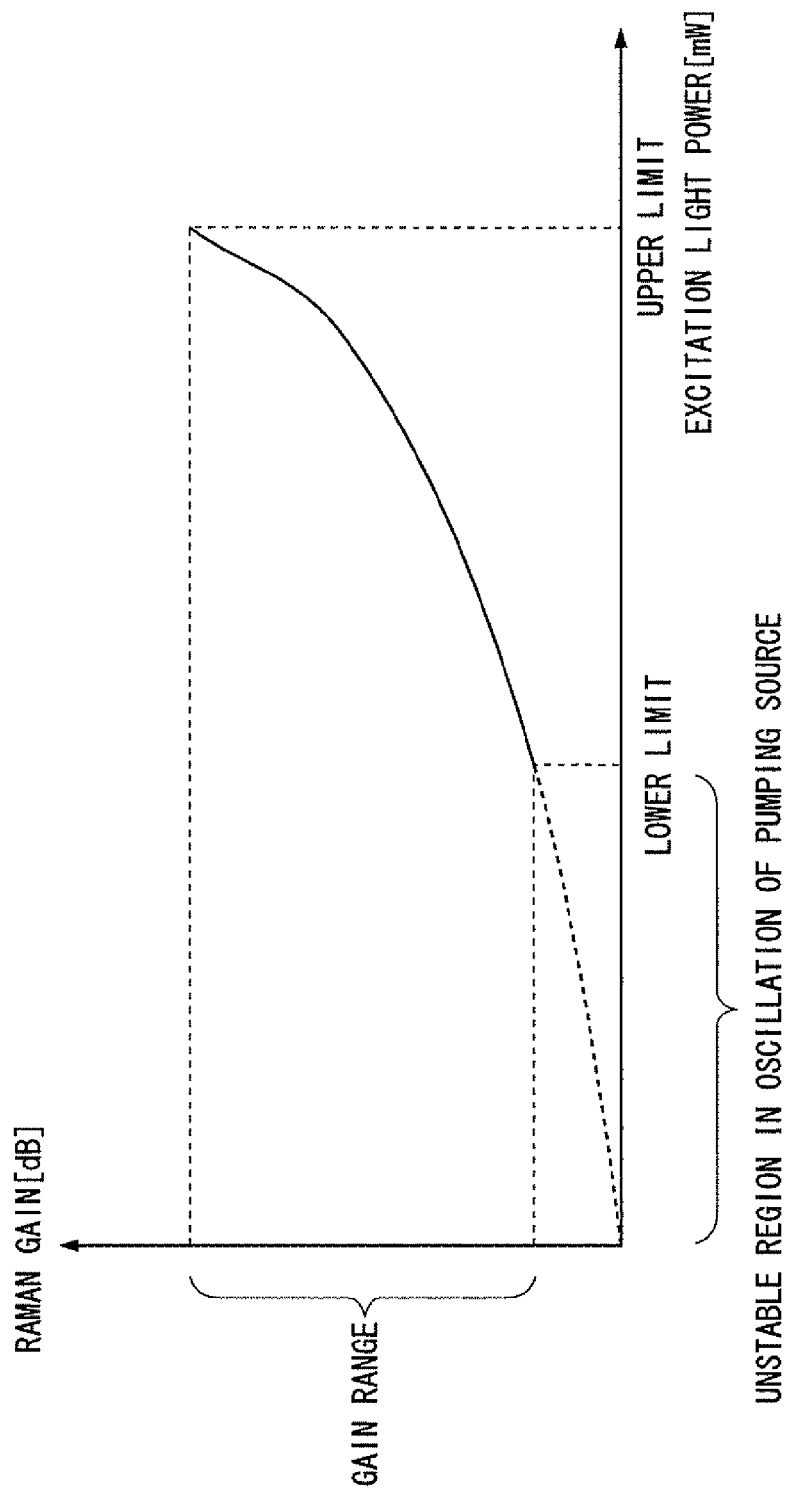
FIG. 12 a diagram showing a relationship between an excitation light inputted to the optical fiber transmission line (amplifying medium) and gain of signal light (Raman gain) amplified with SRS.

FIG. 10 is a block diagram of the Raman amplifier of an embodiment of the present invention. As shown in FIG. 10, the Raman amplifier includes the control circuit 41, pump sources (LDs in the figure) 42 to 45, rare-earth doped fibers 46 to 49, couplers 50 to 53, and channel monitor 54. The Raman amplifier shown in this figure outputs the excitation lights of a plurality of wavelengths from the plurality of pump sources 42 to 45 and amplifies a plurality of signal lights in wider frequency band.

The pump sources 42 to 45 output the excitation lights of different wavelengths. The rare-earth doped fibers 46 to 49 are respectively connected to outputs of the pump sources 42 to 45.

The combining unit 56 includes coupler 50, 51, and 52. The coupler 50 combines the excitation lights outputted from the rare-earth doped fibers 46, 47 and the coupler 51 combines the excitation lights outputted from the rare-earth doped fibers 48, 49. The coupler 52 combines the excitation lights outputted from the couplers 50, 51. The coupler 53 guides the combined excitation light outputted from the coupler 52 to the optical fiber transmission line 55. Moreover, the control circuit 41 and the channel monitor 54 are same as the control circuit 21 and channel monitor 31 of FIG. 9 and explanation of these elements are omitted here.

The rare-earth doped fibers 46 to 49 have the characteristics, as shown in FIG. 4, that the smaller the excitation light power outputted from the pump sources 42 to 45 is, the larger absorption of the excitation light becomes and that the larger the combined excitation light power is, the smaller absorption of the excitation light becomes. The rare-earth doped fiber 46 to 49 is formed, for example, of EDF.

As shown in FIG. 7, the rare-earth doped fiber (EDF) shows different absorption in accordance with wavelength of the excitation light. Since wavelength of the excitation light of the pump source 42 to 45 of FIG. 10 is different, the excitation light power outputted from the rare-earth doped fiber 46 to 49 is not always the same. Therefore, in order to obtain the identical absorption of the rare-earth doped fiber 46 to 49, fiber length of this rare-earth doped fiber 46 to 49 is adjusted in accordance with the wavelength of each excitation light. For example, the shorter the wavelength of excitation light becomes, the smaller absorption in unit length of EDF becomes, and thus the total fiber length is elongated.

Moreover, absorption of the excitation light can also be adjusted by adjusting concentration of erbium included in the rare-earth doped fiber 46 to 49. For example, absorption may be increased increasing erbium concentration of the excitation light having shorter wavelength.

In order to attain same level for the plurality of wavelength multiplexed signal light input from the optical transmission line 55 and outputted from the Raman amplifier, it is required to provide excitation light with its power higher to shorter wavelength excitation, because of a couple of reasons explained below.

One of the reasons is that wavelength characteristic of the transmission line in the C-band shows that loss is generally larger in the short wavelength side and therefore more gain in the shorter wavelength side is required. Another reason is that when a plurality of excitation lights of different wavelength are used, the excitation light power in the shorter wavelength side is absorbed not only by the signal light but also by the excitation light in the longer wavelength side.

Accordingly, using the characteristics, it can be attained to get same level for the plurality of wavelength multiplexed signal light outputted from the Raman amplifier, by setting the EDF length equally, not depending on the wavelength of the excitation light. By setting the EDF length equal, absorption of the excitation light in the shorter wavelength side is decreased and longer wavelength side is increased, and thus excitation light power in the shorter wavelength side is increased and longer wavelength side is decreased As explained above, the rare-earth doped fiber 46 to 49 is respectively connected to outputs of the pump sources 42 to 45. Accordingly, absorption of the excitation light in each wavelength can be adjusted by adjusting fiber length of the rare-earth doped fiber 46 to 49 or by adjusting concentration of the rare-earth element to be doped.

Although a few preferred embodiments of the present invention have been shown and described, it would be appreciated by those skilled in the art that changes may be made in these embodiments without departing from the principles and spirit of the invention, the scope of which is defined in the claim and their equivalents.

What is claimed is:

1. A Raman amplifier, comprising:
a pump source outputting a pumping light;
a rare-earth doped fiber inputting the pumping light so that the pumping light travels through the rare-earth doped fiber without light, other than amplified spontaneous emission (ASE) light, being optically amplified in the rare-earth doped fiber and so that the pumping light is thereby output from the rare-earth doped fiber as an excitation light; and
a guiding unit guiding the excitation light to an optical fiber so that the excitation light travels in the optical fiber in a direction opposite to a signal light propagation direction of signal light propagating in the optical fiber to thereby cause the signal light to be Raman amplified as the signal light propagates in the optical fiber.

2. The Raman amplifier according to claim 1, wherein the pump source comprises:
a plurality of pump sources outputting a plurality of pumping lights as said pumping light inputted to the rare-earth doped fiber, and
wavelengths of the plurality of pumping lights being different from each other.

3. The Raman amplifier according to claim 2, wherein the plurality of pumping lights are combined by a combining unit to thereby be said pumping light inputted to the rare-earth doped fiber.

4. The Raman amplifier according to claim 3, wherein the rare-earth doped fiber is an erbium doped fiber having absorption band in a range from 1400 nm to 1600 nm.

5. A Raman amplifier, comprising:
a plurality of pump sources outputting a plurality of pumping lights respectively;
a plurality of rare-earth doped fibers inputting the plurality of pumping lights, respectively, so that the plurality of pumping lights travel through the plurality of rare-earth doped fibers, respectively, without light, other than amplified spontaneous emission (ASE) light, being optically amplified in the rare-earth doped fibers, and so that the plurality of pumping lights are thereby output from the plurality of rare-earth doped fibers as a plurality of excitation lights, respectively;
a guiding unit guiding the plurality of excitation lights to an optical fiber so that the plurality of excitation lights travel in the optical fiber in a direction opposite to a signal light propagation direction of signal light propagating in the optical fiber to thereby cause the signal light to be Raman amplified as the signal light propagates in the optical fiber.

6. The Raman amplifier according to claim 5, wherein the plurality of pumping lights are combined by a combining unit and input to the guiding unit.

7. The Raman amplifier according to claim 6, wherein absorption of each of the plurality of rare-earth doped fibers is adjusted in accordance with wavelength of the respective pumping light input to the rare-earth doped fiber.

8. The Raman amplifier according to claim 7, wherein absorption of each of the plurality of rare-earth doped fibers is adjusted by the length of the rare-earth doped fiber.

9. The Raman amplifier according to claim 7, wherein absorption of each of the plurality of rare-earth doped fiber is adjusted by the concentration of the rare-earth doped fiber.

10. The Raman amplifier according to claim 7, wherein the rare-earth doped fiber is the erbium doped fiber having absorption band in the range from 1400 nm to 1600 nm.

11. An excitation light source, comprising:
a plurality of pump sources outputting a plurality of pumping lights, respectively, with different wavelengths from each other; and,
a rare-earth doped fiber inputting the plurality of pumping lights so that the plurality of pumping lights travel through the rare-earth doped fiber without light, other than amplified spontaneous emission (ASE) light, being optically amplified in the rare-earth doped fiber, and so that the plurality of pumping lights are thereby output from the rare-earth doped fiber as an excitation light;
wherein the excitation light is supplied to an optical fiber so that the excitation light travels in the optical fiber in a direction opposite to a signal light propagation direction of signal light propagating in the optical fiber to thereby cause the signal light to be Raman amplified as the signal light propagates in the optical fiber.

12. An apparatus comprising:
a plurality of pump sources outputting a plurality of pumping lights, respectively, at different wavelengths from each other;
a plurality of rare-earth doped fibers receiving the plurality of pumping lights, respectively, so that each of the pumping lights travel through the rare-earth doped fibers, respectively, without light, other than amplified spontaneous emission (ASE) light, being optically amplified in the rare-earth doped fibers; and,
a coupler receiving the plurality of pumping lights after having traveled through the rare-earth doped fibers, and combining the received lights into a Raman excitation light.

* * * * *